US006847933B1

(12) United States Patent
Hastings

(10) Patent No.: US 6,847,933 B1
(45) Date of Patent: Jan. 25, 2005

(54) ULTRASOUND IMAGE AND OTHER MEDICAL IMAGE STORAGE SYSTEM

(75) Inventor: Jeffrey S. Hastings, Los Altos, CA (US)

(73) Assignee: Acuson Corporation, Mountain View, CA (US)

( * ) Notice: Subject to any disclaimer, the term of this patent is extended or adjusted under 35 U.S.C. 154(b) by 765 days.

(21) Appl. No.: 09/001,284

(22) Filed: Dec. 31, 1997

(51) Int. Cl.$^7$ .......................... G06F 17/60; A61B 8/00; G06K 9/00
(52) U.S. Cl. .......................... 705/2; 600/437; 382/128; 382/100; 382/130; 382/132; 382/129
(58) Field of Search .................... 705/3, 2; 364/478.02

(56) References Cited

U.S. PATENT DOCUMENTS

| 5,095,906 A | * | 3/1992 | Ema ............................ 600/407 |
| 5,740,801 A | * | 4/1998 | Branson ...................... 600/407 |

OTHER PUBLICATIONS

Orphanoudakis et al., Development of an Integrated Image Management and Communication System on Crete, http://www.cs.pitt.edu/~tsamard/car95.html, 1995.*
Storage Tek, "Medical Image Archive", wysiwyg://179/http://www.storek.com/StorageTek/mktdev.medical, 1998.*
Camino, "Join the Smart Migration, The Highway Server", http://www.caminosoft.com/whitepaper.html, 1997.*

IEEE Communication Magazine, vol. 34, issue 7, pp. 36–45, "Intelligent Image Management in a Distributed PACS and Telemedicine Enviroment", 1996.*
Infrastructure Design of a Picture Archiving and Communication System, H.K. Huang and Ricky K. Taira, Apr. 1992.*
A study of archiving requirements for a radiology department, Samuel J. Dwyer III, Joy A.Johnson, Glendon G. Cox, Douglas L. Nelson, William H. Anderson, Larry T.Cook, 1985.*
Exploiting Database Technology in the Medical Arena; A critical assessment of integrated systems for piture archiving and communications, IEEE 1992, 0739–5157 pp 42–49.*
Understanding and Using DICOM, the Data Interchange Standard for Biomedical Imaging; W. Dean Bidgood, Jr., MD, MS, Steven C. Horh, MD, Fred W. Prior, PHD, Donald E. Van Syckle. Journal of the American Medical Informatics Association, V4, N3, May/Jun. 1997.*

* cited by examiner

Primary Examiner—Eric W. Stamber
Assistant Examiner—Yehdega Retta

(57) ABSTRACT

A medical image storage system is provided that integrates a clinical information system with a medical image management system. Such an integrated system can be used in a method that uses clinical information associated with a medical image to determine when and where the medical image should be stored. Because the probability of a medical image being accessed is generally governed by the diagnostic significance of the image, this integrated system provides more efficient storage of medical images as compared to conventional systems that operate independently of diagnostic information.

17 Claims, 1 Drawing Sheet

ULTRASOUND IMAGE AND OTHER MEDICAL IMAGE STORAGE SYSTEM

BACKGROUND

Medical image storage systems typically store medical images in on-line, near on-line, and off-line storage devices. While on-line devices provide the fastest access to stored medical images, they are the most expensive storage devices. To make the most efficient use of storage resources, medical image management systems use a hierarchical file system to keep only the most-needed images in storage devices with the fastest access and highest cost. In many systems, there are separate algorithms that use only attributes of the study (e.g., date/time of study acquisition, whether the study has been read) or the status of the storage device (e.g., the amount of available storage space) to determine when to move a medical image from one storage device to another.

The primary disadvantage of conventional systems is that the information used to determine image archiving does not accurately reflect the probability of the medical image being accessed in the future. There is, therefore, a need for a system and method that will more efficiently store medical images.

SUMMARY

The present invention is defined by the following claims, and nothing in this section should be taken as a limitation on those claims.

By way of introduction, the preferred embodiments described below include a medical image storage system that integrates a clinical information system with a medical image management system. Such an integrated system can be used in a method that uses clinical information associated with a medical image to determine when and where the medical image should be stored. Because the probability of a medical image being accessed is generally governed by the diagnostic significance of the image, the embodiments described below provide more efficient storage of medical images as compared to conventional systems that operate independently of diagnostic information.

The preferred embodiments will now be described with reference to the attached drawings.

DETAILED DESCRIPTION OF THE PRESENTLY PREFERRED EMBODIMENTS

Figure 1:
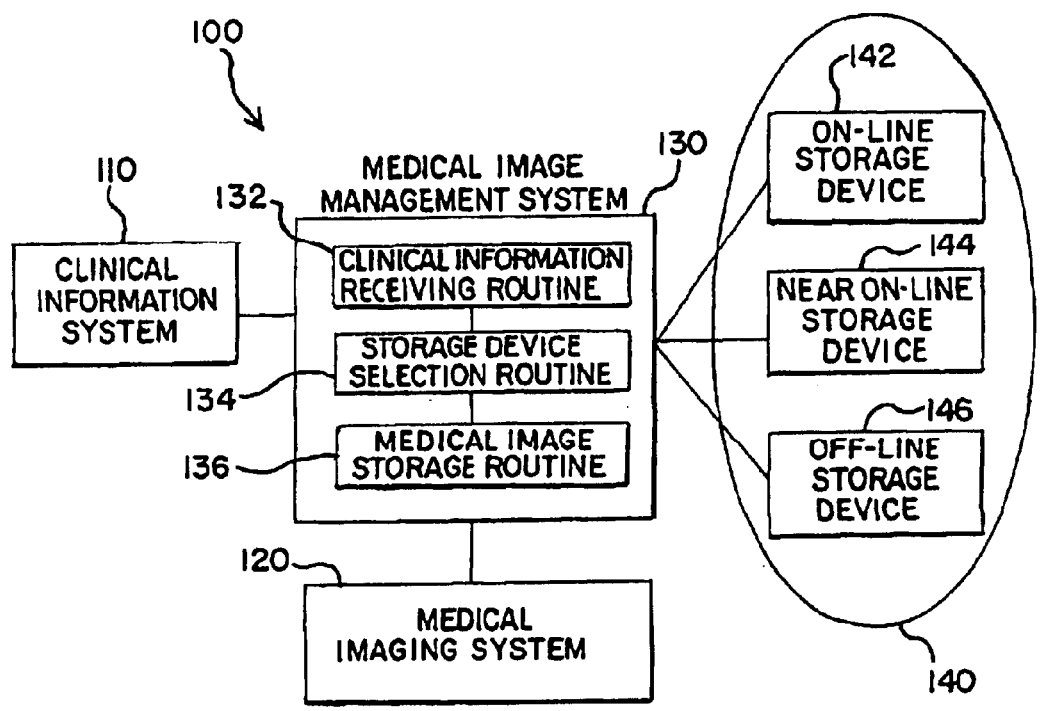
FIG. 1 is a block diagram of a medical image storage system of a preferred embodiment.

Turning now to the drawings, FIG. 1 is a block diagram of a system 100 that can be used to practice the presently preferred embodiments of this invention. As shown in FIG. 1, this system 100 comprises a clinical information system 110 and a medical imaging system 120 coupled with a medical image management system 130. As used herein, the term "coupled with" means directly coupled with or indirectly coupled with through one or more components. The medical image management system 130 comprises a clinical information receiving routine 132, a storage device selection routine 134, and a medical image storage routine 136. While it is preferred that these routines be implemented with software and that the medical image management system 130 comprise the necessary hardware components (such as a CPU) to run the software, it is important to note that any appropriate hardware, analog or digital, and any appropriate software language can be used. The medical image management system 130 also is coupled with a plurality of storage devices 140, which can comprise an on-line storage device 142 (e.g., a hard disk drive), a near on-line storage device 144 (e.g., a removable magneto-optical disk that will remain in the disk drive), and an off-line storage device 146 (e.g., a removable magneto-optical disk that will be stored in an off-line media library). The widest variety of devices can be used to implement the elements described above. For example, the plurality of storage devices 140 can comprise, for example, a hard disk, a magneto-optical disk, a CD-ROM, a write-once/read many (WORM) disk, a digital linear tape (DLT), a digital versatile disk (DVD), or a digital audio tape (DAT). Also, elements that are shown in separate boxes in FIG. 1 may be combined in a single component. For example, although the clinical information system 110 and the medical image management system 130 are shown as two stand-alone components in FIG. 1, the medical image management system 130 can be incorporated into the clinical information system 110.

Figure 2:
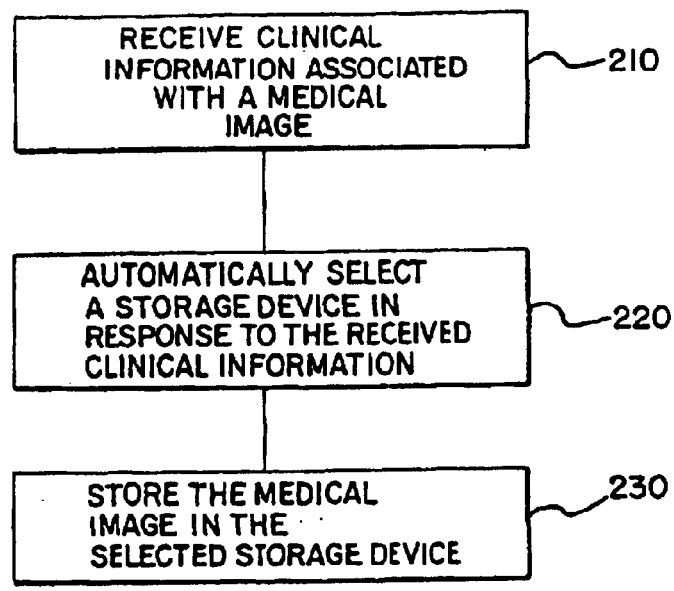
FIG. 2 is a flow chart of a method of a preferred embodiment for storing a medical image.

Because it is coupled with the clinical information system 110, the medical image management system 130 can use clinical information about a patient to decide when and where to move medical images in the plurality of storage devices 140. A method that uses clinical information about a patient to store medical images is shown in the flow chart of FIG. 2. As shown in FIG. 2, this method comprises the steps of receiving clinical information associated with a medical image (step 210), automatically selecting a storage device in response to the received clinical information (step 220), and storing the medical image in the selected storage device (step 230). It is important to note that clinical information can be used with or instead of currently used retention criteria such as the date/time of study acquisition and the amount of available storage. While it is preferred that clinical information comprise diagnosis data, the term "clinical information" is intended broadly to encompass any medical information about a patient that can be used by the image management system 130 to determine medical image retention. Clinical information can include, but is not limited to, diagnostic data, in-patient/out-patient status, pregnancy status, patient presence in a medical facility, lab results, patient progress notes, clinical notes, physician's diagnosis and comments, nurse's comments, other health care provider's diagnosis or comments, patient indicators or symptoms, ECG results, a diagnosis from any imaging modality, or any combination thereof.

The following examples illustrate the various forms "clinical information" can take and are not intended to limit the invention. As will be seen through these examples, clinical information better reflects the probability of a medical image being accessed in the future, and image management systems that use clinical information as a data retention criterion provide more efficient storage of medical images as compared to conventional systems.

In one example, the clinical information associated with the medical image comprises diagnosis data and in-patient/out-patient status. After a medical image is created by the medical imaging system 120, the image is stored for immediate access in the on-line storage device 142. The clinical information receiving routine 132 of the medical image management system 130 receives clinical information about the image from the clinical information system 110. The storage device selection routine 134 then analyzes the clinical information. If the diagnosis associated with the image is normal and the patient is an out-patient, the probability of the image needing to be recalled is extremely low, and the storage device selection routine 134 chooses to store the image in the off-line storage device 146. The medical image storage routine 136 then moves the image from the on-line 142 to the off-line 146 storage device. Since conventional management systems may have moved such an image to the near on-line storage device 144, the management system 130 of this preferred embodiment offers the advantage of making more efficient use of storage resources.

As another example, if the clinical information system 110 knows that a patient is six-weeks pregnant and is at high risk of losing the fetus, the storage device selection routine 134 assumes that the acquired image will be needed in the near fuiture for comparative studies and automatically selects the near on-line storage device 144 to house the image. If, however, the patient loses the fetus one week later, the storage device selection routine 134 knows that the image now has a small probability of being recalled and can instruct the medical image storage routine 136 to move the image from the near on-line 144 to the off-line 146 storage device.

If the medical image management system 130 knows that an image is of immediate importance to a physician, it can move the image to the on-line storage device 142 from another storage device after image acquisition and initial storage. Suppose a patient is admitted into an emergency room with severe chest pain. Once the clinical information receiving routine 132 gathers this data from the clinical information system 110, the medical image management system 130 can move an image stored in the near on-line 144 or off-line 146 storage device to the on-line storage device 142 so the emergency room physician immediately can view the most current medical image (e.g., an echocardiogram) to determine the best course of treatment. In contrast, with conventional image management systems, the physician would lose valuable time retrieving the image from a near on-line or off-line storage device.

It is important to note that while in the above-described examples, a single storage device selection routine 134 was used to determine when and where a medical image should be stored, separate routines can be used to determine when a medical image should be moved to or from the on-line, near on-line, and off-line storage devices. Also, as illustrated above, the storage device selection routine 134 can operate when an image is first acquired or after the initial storage of the image in a storage device. In the latter situation, the storage device selection routine 134 can move an image in response to newly-received clinical information associated with the stored image or in response to a scheduled storage-device-maintenance routine.

For simplicity, the term "clinical information system" in this specification and the following claims is intended broadly to encompass any repository of information that holds clinical information. Depending on the system's environment, a "clinical information system" can be a Hospital Information System, a Radiology Information System, or a Cardiology Information System, for example. Clinical information can be provided to the clinical information system by a physician (such as when a physician manually enters a diagnosis into the system) or can be automatically generated by the clinical information system (such as when the system analyzes a medical image and automatically generates diagnostic information).

Also for simplicity, the term "medical images" in this specification and the following claims is intended broadly to encompass any medical image generated by medical imaging equipment. While in one preferred embodiment the medical image is an ultrasound image, other medical images can be generated by any of the following modalities: computed radiography, magnetic resonance, angioscopy, color flow Doppler, cystoscopy, diaphanography, echocardiography, fluoresosin angiography, laparoscopy, magnetic resonance angiography, positron emission tomography, single-photon emission computed tomography, x-ray angiography, computed tomography, nuclear medicine, biomagnetic imaging, culposcopy, duplex Doppler, digital microscopy, endoscopy, fundoscopy, laser surface scan, magnetic resonance spectroscopy, radiographic imaging, thermography, radio fluroscopy, or any combination thereof.

The foregoing detailed description has described only a few of the many forms that this invention can take. Of course, many changes and modifications are possible to the preferred embodiments described above. For this reason it is intended that this detailed description be regarded as an illustration and not as a limitation of the invention. It is only the following claims, including all equivalents, that are intended to define the scope of this invention.

What is claimed is:

1. A system for storing a medical image comprising:
   a plurality of storage devices;
   a clinical information system comprising patient diagnostic information associated with a medical image; and
   a medical image management system; coupled with the plurality of storage devices and the clinical information system;
   wherein the clinical information system is operative to send patient diagnostic information to the medical image management system and wherein the medical image management system is operative to automatically select a storage device in which to store the medical image by analyzing the patient diagnostic information and is further operative to store the medical image in the selected storage device.

2. The invention of claim 1, further comprising a medical imaging system, coupled with said medical image management system, operative to generate said medical image.

3. The invention of claim 1, wherein said clinical information is provided to said clinical information system by a physician.

4. The invention of claim 1, wherein said clinical information is automatically generated by said clinical information system.

5. The invention of claim 1, wherein said plurality of storage devices comprises a storage device selected from the group consisting of: an on-line storage device, a near on-line storage device, an off-line storage device, a hard disk, a magneto-optical disk, a CD-ROM, a write-once/read many disk, a digital linear tape, a digital versatile disk, and a digital audio tape.

6. A medical image management system comprising:
   first means for automatically selecting a storage device coupled with said medical image management system by analyzing patient diagnostic information received from a clinical information system coupled with said medical image management system; and
   second means, coupled with said first means, for controlling storage of said medical image in said selected storage device.

7. A method for storing a medical image, the method comprising:

(a) sending patient diagnostic information associated with a medical image from a clinical information system to a medical image management system;

(b) with the medical image management system, automatically selecting a storage device in which to store the medical image by analyzing the patient diagnostic information; and (c) storing the medical image in the storage device selected in (b).

8. The method of claim 7, wherein (a)–(c) are performed in response to a newly-acquired medical image.

9. The method of claim 7, wherein (a)–(c) are performed in response to newly-received clinical information associated with a stored medical image.

10. The method of claim 7, wherein (a)–(c) are performed in response to a scheduled storage-device-maintenance routine.

11. The invention of claim 1, 6, or 7, wherein said medical image comprises an image created by a modality selected from the group consisting of: ultrasound, computed radiography, magnetic resonance, angioscopy, color flow Doppler, cystoscopy, diaphanography, echocardiography, fluoresosin angiography, laparoscopy, magnetic resonance angiography, positron emission tomography, single-photon emission computed tomography, x-ray angiography, computed tomography, nuclear medicine, biomagnetic imaging, culposcopy, duplex Doppler, digital microscopy, endoscopy, fundoscopy, laser surface scan, magnetic resonance spectroscopy, radiographic imaging, thermography, radio fluroscopy, or any combination thereof.

12. The invention of claim 1, 6, or 7, wherein patient diagnostic information comprises pregnancy status.

13. The invention of claim 1, 6, or 7, wherein patient diagnostic information comprises lab results.

14. The invention of claim 1, 6, or 7, wherein patient diagnostic information comprises patient progress or clinical notes.

15. The invention of claim 1, 6, or 7, wherein patient diagnostic information comprises a physician's, nurse's, or other health care provider's comments.

16. The invention of claim 1, 6, or 7, wherein patient diagnostic information comprises patient indicators or symptoms.

17. The invention of claim 1, 6, or 7, wherein patient diagnostic information comprises ECG results.

* * * * *